United States Patent
Morikawa (10) Patent No.: US 10,753,319 B2
(45) Date of Patent: *Aug. 25, 2020

(54) TUBULAR AIR CLEANER FOR INTERNAL COMBUSTION ENGINE

(71) Applicant: TOYOTA BOSHOKU KABUSHIKI KAISHA, Aichi-ken (JP)

(72) Inventor: Hiroaki Morikawa, Kitanagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 157 days.

This patent is subject to a terminal disclaimer.

(21) Appl. No.: 15/819,723

(22) Filed: Nov. 21, 2017

(65) Prior Publication Data

US 2018/0149118 A1 May 31, 2018

(30) Foreign Application Priority Data

Nov. 30, 2016 (JP) .................................. 2016-233022

(51) Int. Cl.
*F02M 35/02* (2006.01)
*B01D 46/24* (2006.01)
(Continued)

(52) U.S. Cl.
CPC ..... *F02M 35/0201* (2013.01); *B01D 46/0036* (2013.01); *B01D 46/2411* (2013.01);
(Continued)

(58) Field of Classification Search
CPC ............ B01D 53/0415; B01D 46/2411; B01D 46/521; B01D 53/0407; B01D 46/0036;
(Continued)

(56) References Cited

U.S. PATENT DOCUMENTS 3,873,287 A * 3/1975 Barnebey ........... B01D 46/0013
96/129
2006/0107836 A1* 5/2006 Maier ................ B01D 46/0024
96/134

(Continued)

FOREIGN PATENT DOCUMENTS

JP        59-54740 U       4/1984
JP        2001-123897      5/2001
JP        2005-194952 A    7/2005

OTHER PUBLICATIONS

Office Action issued in Japanese Patent Application No. 2016-233022, dated May 19, 2020.

*Primary Examiner* — Minh Chau T Pham
(74) *Attorney, Agent, or Firm* — Greenblum & Bernstein, P.L.C.

(57) ABSTRACT

A tubular air cleaner for an internal combustion engine includes a housing and a filter element. The housing includes a case and a cap coupled to the case in a removable manner. The cap includes a cap body and an adsorbent filter assembly. The adsorbent filter assembly includes a planar adsorbent filter, which adsorbs evaporated fuel of the internal combustion engine, and a fixing portion. The adsorbent filter is located at an inner side of the filter element and extends in an axial direction of the filter element. The inner surface of the filter element is spaced apart from each of opposite planes of the adsorbent filter by a gap that allows air to reach an outlet without passing through the adsorbent filter.

4 Claims, 6 Drawing Sheets

(51) Int. Cl.
*B01D 53/04* (2006.01)
*B01D 46/00* (2006.01)
*B01D 46/52* (2006.01)
*F02M 25/08* (2006.01)
*F02M 35/024* (2006.01)

(52) U.S. Cl.
CPC ....... *B01D 46/521* (2013.01); *B01D 53/0407* (2013.01); *B01D 53/0415* (2013.01); *F02M 25/089* (2013.01); *F02M 25/0854* (2013.01); *F02M 35/02483* (2013.01); *B01D 2253/102* (2013.01); *B01D 2257/702* (2013.01); *B01D 2259/4566* (2013.01); *B01D 2279/60* (2013.01)

(58) Field of Classification Search
CPC ........ B01D 2259/45; B01D 2259/2279; B01D 2259/60; B01D 2253/102; F02M 35/0201; F02M 35/02483; F02M 25/0854; F02M 25/089
USPC ......... 55/385.3, 498, 502, 497, 521; 96/147, 96/148; 123/198 E
See application file for complete search history.

(56) References Cited

U.S. PATENT DOCUMENTS

| | | | |
|---|---|---|---|
| 2018/0147525 A1* | 5/2018 | Morikawa | B01D 46/2411 |
| 2018/0149117 A1* | 5/2018 | Morikawa | B01D 46/2411 |
| 2018/0149119 A1* | 5/2018 | Morikawa | B01D 46/0002 |

* cited by examiner

TUBULAR AIR CLEANER FOR INTERNAL COMBUSTION ENGINE

BACKGROUND ART

The present invention relates to a tubular air cleaner arranged in an intake air passage of an internal combustion engine.

A prior art tubular air cleaner for an internal combustion engine includes a tubular housing and a tubular filter element. The housing includes a circumferential wall including an inlet, a top wall including an outlet, and a bottom wall opposed to the top wall. The filter element is accommodated in the housing.

The tubular filter element includes a pleated tubular filter portion, which is formed by pleating a filter medium sheet, and two sealing portions, which are arranged on opposite ends of the filter portion in an axial direction to seal the space between the top wall and the bottom wall of the housing.

Japanese Laid-Open Patent Publication No. 2001-123897 discloses a filter element that includes a filter portion and an inner tube, which is arranged at an inner side of the filter portion. The inner tube includes an adsorbent, which adsorbs evaporated fuel, and has a number of air holes.

SUMMARY OF THE INVENTION

The filter element described in Japanese Laid-Open Patent Publication No. 2001-123897 has the drawback of increasing the airflow resistance. The reason is that although the inner tube has a number of air holes, the inner tube blocks a passage through which the air flows. Therefore, there is room for improvement to reduce the air pressure loss.

It is an object of the present invention to provide a tubular air cleaner for an internal combustion engine that reduces air pressure loss.

One aspect of the present invention is a tubular air cleaner for an internal combustion engine arranged in an intake air passage of the internal combustion engine. The tubular air cleaner includes a tubular housing including a circumferential wall including an inlet, a top wall including an outlet, and a bottom wall opposed to the top wall and a tubular filter element accommodated in the housing. The housing includes a case including the bottom wall and a cap including the top wall. The cap is coupled to the case in a removable manner. The cap includes a cap body, which includes the top wall and the outlet, and an adsorbent filter assembly. The adsorbent filter assembly includes a planar adsorbent filter, which adsorbs evaporated fuel of the internal combustion engine, and a fixing portion, which is formed integrally with the adsorbent filter and fixed to an inner surface of the top wall. The adsorbent filter is located at an inner side of the filter element and extends in an axial direction of the filter element. The inner surface of the filter element is spaced apart from each of opposite planes of the adsorbent filter by a gap that allows air to reach the outlet without passing through the adsorbent filter.

With this structure, when air flows through the filter element into the inner side of the filter element, the air is allowed to reach the outlet without passing through the adsorbent filter. Thus, when air flows through the inner side of the filter element, an increase in the flow resistance caused by the adsorbent filter will be limited. Consequently, the air pressure loss is reduced.

Additionally, in the above structure, the adsorbent filter assembly includes the adsorbent filter and the fixing portion, and the cap body includes the outlet. Thus, when the air cleaner is destined for a location that requires the adsorbent filter, the cap body to which the adsorbent filter assembly is coupled is used as the cap. When the air cleaner is destined for a location that does not require the adsorbent filter, the adsorbent filter assembly is not coupled to the cap body. That is, only the cap body may be used as the cap. This simplifies the structure of the adsorbent filter assembly. Also, the same cap body may be used regardless of whether or not the adsorbent filter is coupled to.

Other aspects and advantages of the embodiments will become apparent from the following description, taken in conjunction with the accompanying drawings, illustrating by way of example the principles of the invention.

DESCRIPTION OF THE EMBODIMENTS

First Embodiment

A first embodiment will now be described with reference to FIGS. 1 to 4.

Figure 1:
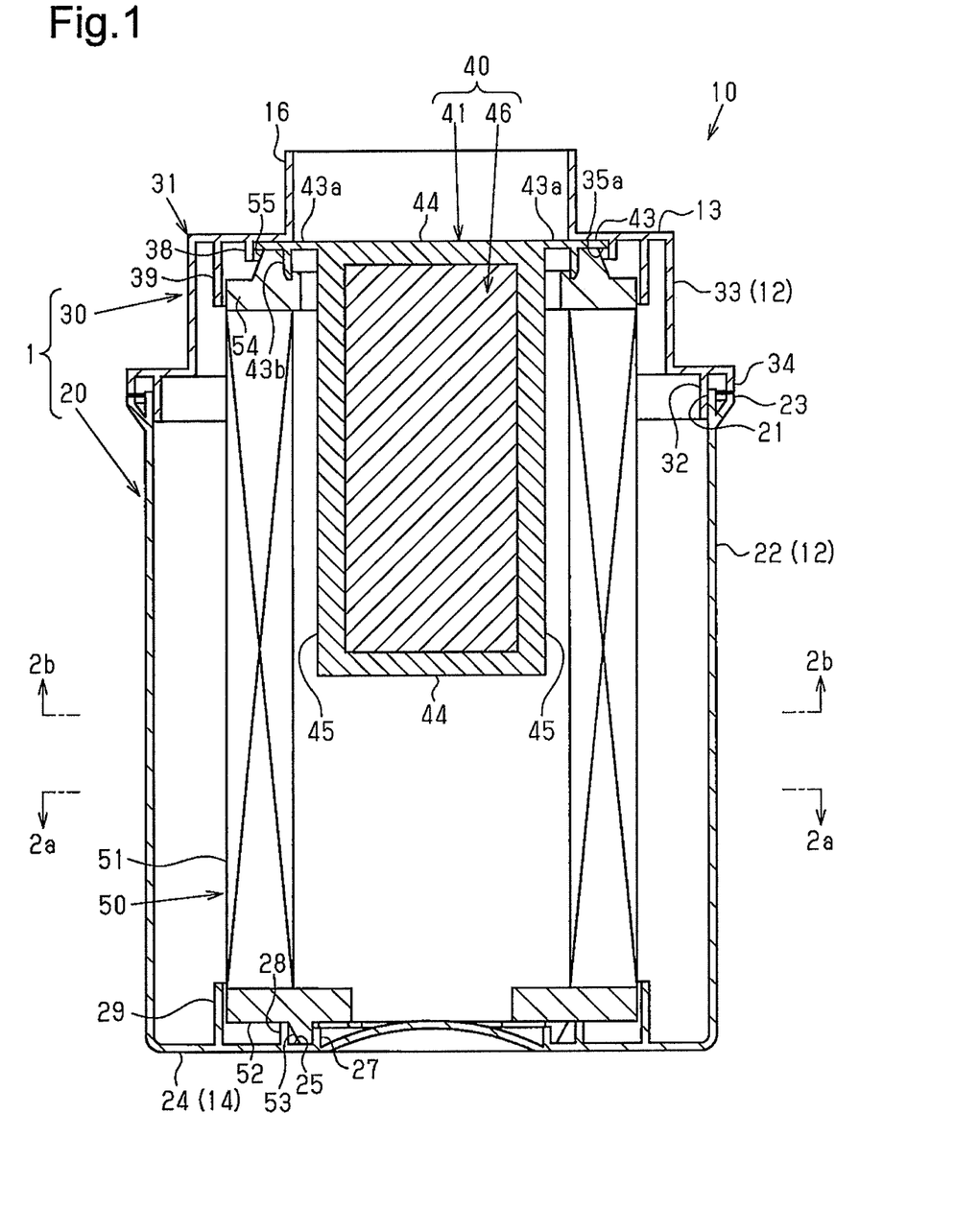
FIG. 1 is a vertical cross-sectional view showing a first embodiment of a tubular air cleaner.
Figure 2A:
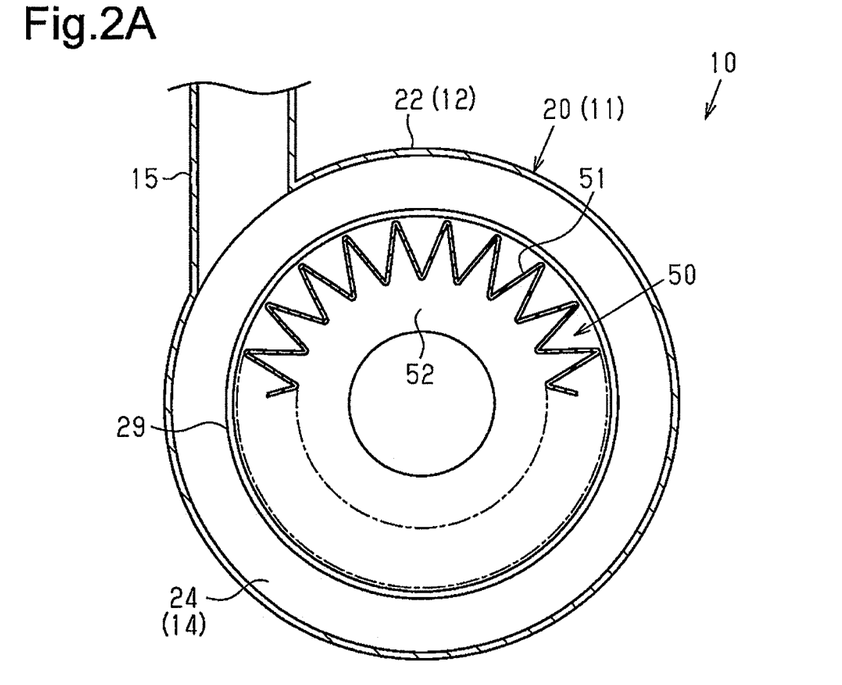
FIG. 2A is a cross-sectional view taken along line 2a-2a in FIG. 1.
Figure 2B:
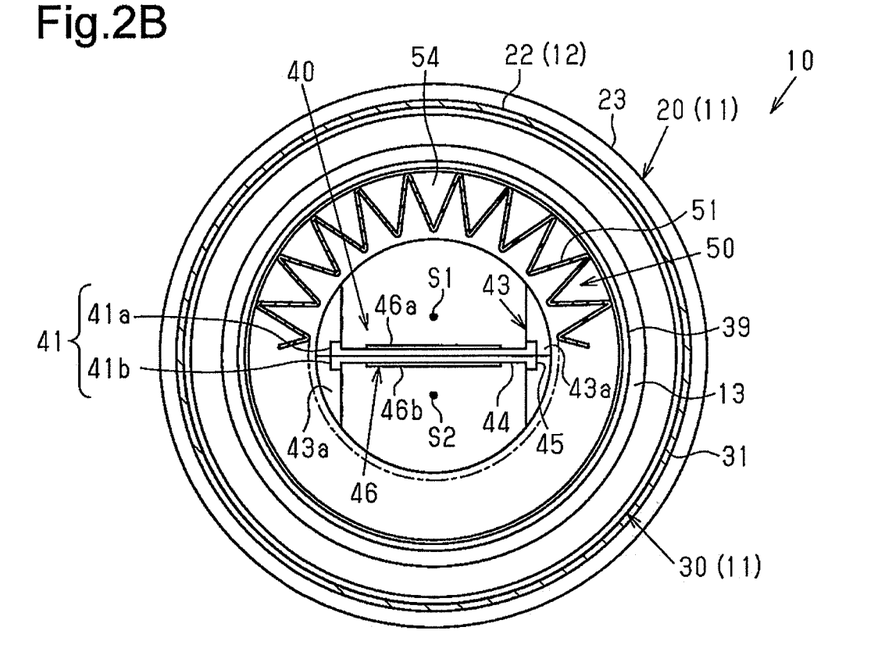
FIG. 2B is a cross-sectional view taken along line 2b-2b in FIG. 1.

As shown in FIGS. 1, 2A, and 2B, a tubular air cleaner (hereafter, referred to as air cleaner 10) is arranged in an intake air passage of the internal combustion engine and includes a tubular housing 11. The tubular housing 11 includes a circumferential wall 12 including an inlet 15, a top wall 13 including an outlet 16, and a bottom wall 14 opposed to the top wall 13. A tubular filter element 50 is accommodated in the housing 11.

Filter Element 50

As shown in FIGS. 1, 2A, and 2B, the filter element 50 includes a pleated tubular filter portion 51, which is formed by pleating a filter medium sheet such as a non-woven cloth or filter paper, a first sealing portion 52, and a second sealing portion 54, each of which is discoid and has a center hole. The first sealing portion 52 and the second sealing portion 54 are located on one end and another end of the filter portion 51 in an axial direction.

As shown in FIG. 1, the first sealing portion 52 has an end surface that is formed integrally with a plurality of projections 53 arranged at intervals in the circumferential direction. The second sealing portion 54 has an end surface that is formed integrally with an annular projection 55.

Housing 11

The housing 11 includes a case 20, which includes a portion of the circumferential wall 12 and the bottom wall 14, and a cap 30, which includes a portion of the circumferential wall 12 and the top wall 13 and is coupled to the case 20 in a removable manner.

The case 20 and the cap 30 will now be described in detail.

Case 20

As shown in FIGS. 1, 2A, and 2B, the case 20 includes a tubular case circumferential wall 22, which extends around an opening 21. A case flange 23 is formed in the entire circumferential edge of the case 20 defining the opening 21.

As shown in FIGS. 1 and 2A, the case 20 includes a case bottom wall 24, which defines the bottom wall 14 of the housing 11, and the tubular inlet 15, which projects from an outer circumferential surface of the case circumferential wall 22 and communicates the inside of the case 20 to the outside of the case 20.

As shown in FIG. 1, the inner surface of the case bottom wall 24 includes an inner projection 27, an intermediate projection 28, and an outer projection 29, which are annular and concentric with each other about the central axis of the case 20. The inner surface of the case bottom wall 24, the outer circumferential surface of the inner projection 27, and the inner circumferential surface of the intermediate projection 28 define an annular recess 25. The projections 53 of the first sealing portion 52 of the filter element 50 are fitted into the recess 25. Each projection 53 includes an end surface that contacts the inner surface of the case bottom wall 24 of the recess 25. This seals the space between the case 20 and the first sealing portion 52.

The outer projection 29 projects further than the inner projection 27 and the intermediate projection 28 toward the opening 21. The inner circumferential surface of the outer projection 29 is spaced apart from and opposed to the outer circumferential surface of the first sealing portion 52 in the radial direction.

The case 20 is formed from a rigid resin material.

Cap 30

As shown in FIGS. 1 and 2B, the cap 30 includes a cap body 31 and an adsorbent filter assembly 40.

As shown in FIG. 1, the cap body 31 includes a tubular cap circumferential wall 33, which extends around an opening 32, the top wall 13, and the tubular outlet 16, which projects from an outer surface of the top wall 13 and communicates the inside of the cap body 31 to the outside of the cap body 31. A cap flange 34 is formed in the entire circumferential edge of the cap circumferential wall 33.

The inner surface of the top wall 13 includes an intermediate projection 38 and an outer projection 39, which are annular and concentric with each other about the central axis of the cap body 31. The outer projection 39 projects further than the intermediate projection 38 toward the opening 32.

The cap body 31 is formed from a rigid resin material.

Figure 3:
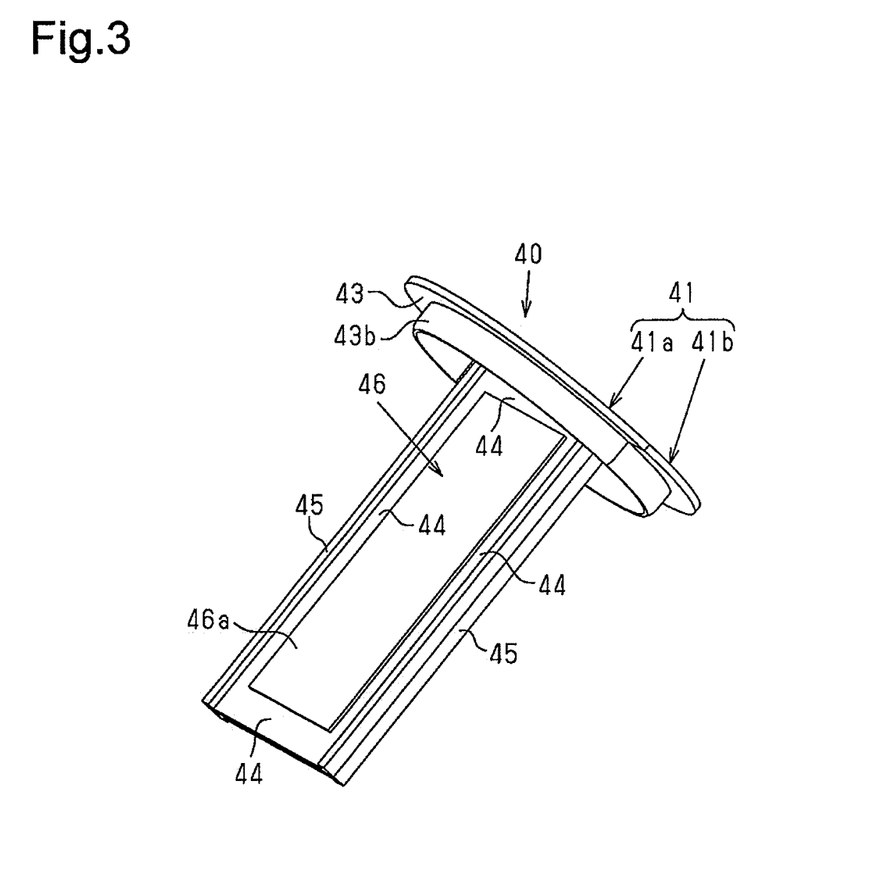
FIG. 3 is a perspective view showing an adsorbent filter assembly of the first embodiment.
Figure 4:
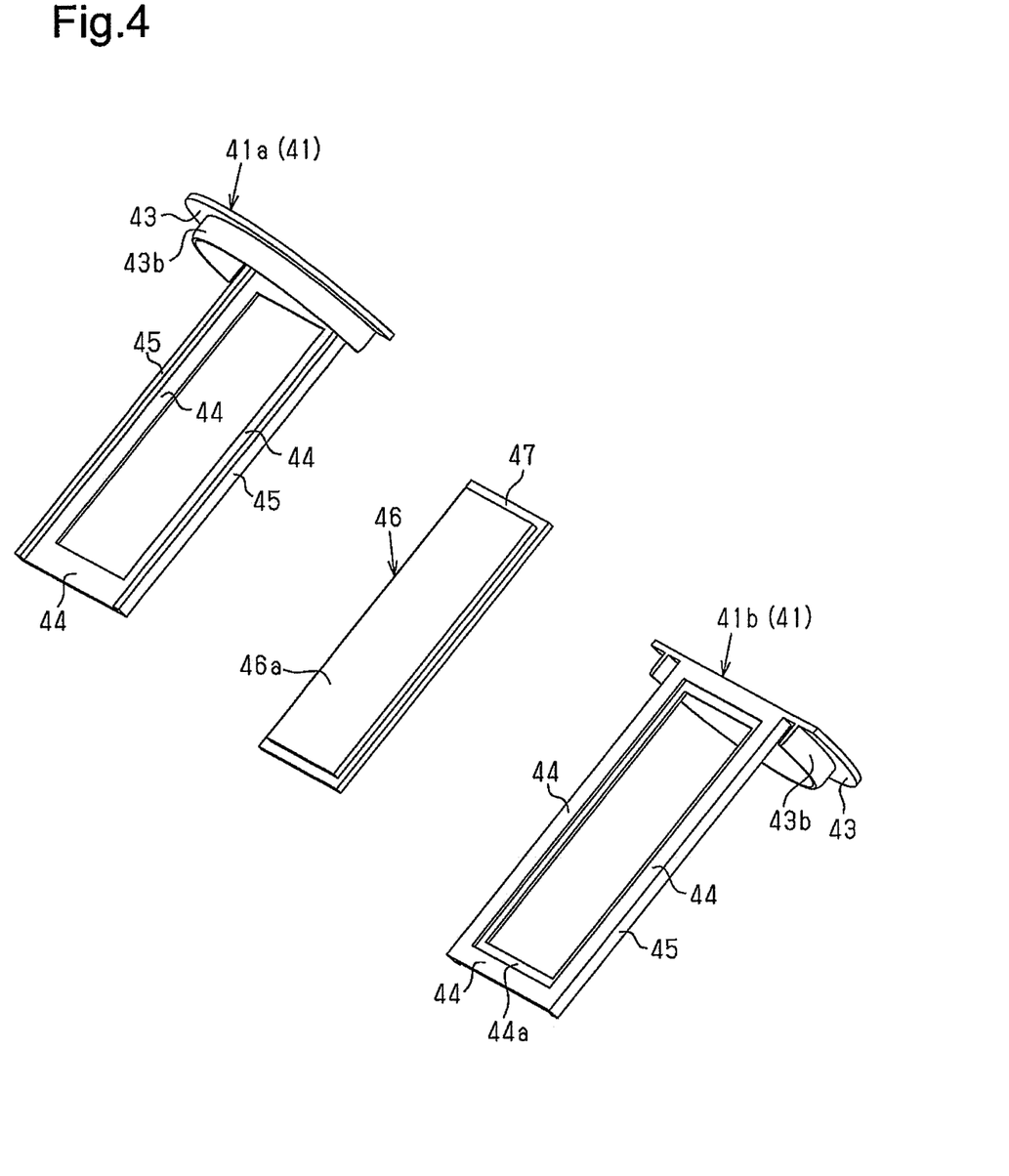
FIG. 4 is an exploded perspective view showing the adsorbent filter assembly of the first embodiment including a first half body, a second half body, and an adsorbent filter.

As shown in FIGS. 1, 3, and 4, the adsorbent filter assembly 40 includes an adsorbent filter 46, which adsorbs evaporated fuel of the internal combustion engine, and a holding member 41, which holds the adsorbent filter 46 and is fixed to the cap body 31.

Although not shown in the drawings, the adsorbent filter 46 has the form of a rectangular plate and includes an adsorbent layer formed from activated carbon particles, two non-woven sheets holding the adsorbent layer in between, two glass fiber nets holding the two non-woven sheets in between, and two resin nets holding the two glass fiber nets in between. The entire periphery of the adsorbent filter 46 is thermally compressed defining a peripheral edge portion 47.

As shown in FIGS. 1 and 3, the holding member 41 includes a substantially annular fixing portion 43. The outer diameter of the fixing portion 43 is set to be slightly smaller than the inner diameter of the intermediate projection 38. The inner surface of the fixing portion 43 includes an annular inner projection 43b.

As shown in FIGS. 1, 2B, and 3, the holding member 41 includes a looped rectangular frame 44. The fixing portion 43 includes two opposing parts 43a, which inwardly project. The frame 44 connects the two opposing parts 43a and projects toward a side opposite to the outlet 16.

The outer periphery of the frame 44 includes two pillars 45, which extend in an axial direction of the filter element 50. In the present embodiment, the width of each pillar 45 is fixed in an extension direction of the pillar 45.

As shown in FIG. 4, the holding member 41 of the present embodiment includes a first half body 41a and a second half body 41b, which are formed separately from each other from a rigid resin material. The half bodies 41a, 41b have surfaces opposed to each other, each of which includes an accommodation portion 44a. The accommodation portion 44a entirely extends around the inner periphery of the corresponding one of the half bodies 41a, 41b to accommodate the peripheral edge portion 47 of the adsorbent filter 46.

With the peripheral edge portion 47 of the adsorbent filter 46 held between the accommodation portions 44a of the half bodies 41a, 41b, the half bodies 41a, 41b are bonded to each other, for example, through vibration welding. This forms the adsorbent filter assembly 40.

As shown in FIG. 1, the fixing portion 43 has a circumference that is entirely fixed to the inner surface of the top wall 13. The fixing portion 43 and the top wall 13 are bonded to each other, for example, through vibration welding.

The inner surface of the fixing portion 43, the outer circumferential surface of the inner projection 43b, and the inner circumferential surface of the intermediate projection 38 define an annular recess 35a. The annular projection 55 of the second sealing portion 54 of the filter element 50 is fitted into the recess 35a. The annular projection 55 includes an end surface that contacts the inner surface (hereafter, may be referred to as sealing surface) of the fixing portion 43 of the recess 35a. This seals the space between the cap 30 and the second sealing portion 54. The inner circumferential surface of the outer projection 39 is spaced apart from and opposed to the outer circumferential surface of the second sealing portion 54 in the radial direction.

As shown in FIGS. 1 and 2B, the adsorbent filter 46 extends through the central axis of the filter element 50 in the axial direction of the filter element 50.

As shown in FIG. 2B, the adsorbent filter 46 includes opposite planes 46a, 46b, which are spaced apart from the filter portion 51 of the filter element 50 and the inner circumferential surface of the second sealing portion 54 by gaps S1, S2. The gaps S1, S2 allow air to reach the outlet 16 without passing through the adsorbent filter 46.

The first embodiment of the tubular air cleaner for an internal combustion engine has the advantages described below.

(1) The planar adsorbent filter 46, which adsorbs evaporated fuel of the internal combustion engine, is located at the inner side of the filter element 50 extending in the axial direction of the filter element 50. The inner surface of the filter element 50 is spaced apart from the opposite planes 46a, 46b of the adsorbent filter 46 by the gaps S1, S2. The gaps S1, S2 allow air to reach the outlet 16 without passing through the adsorbent filter 46.

With this structure, when air flows through the filter portion 51 of the filter element 50 into the inner side of the filter element 50, the air is allowed to reach the outlet 16 without passing through the adsorbent filter 46. Thus, when air flows through the inner side of the filter element 50, an increase in the flow resistance caused by the adsorbent filter 46 will be limited. Consequently, the air pressure loss is reduced.

(2) The housing 11 includes the case 20, which includes the bottom wall 14, and the cap 30, which includes the top wall 13 and is coupled to the case 20 in a removable manner. The cap 30 includes the cap body 31, which includes the top wall 13 and the outlet 16, and the adsorbent filter assembly 40. The adsorbent filter assembly 40 includes the adsorbent filter 46 and the fixing portion 43, which is formed integrally with the adsorbent filter 46 and is fixed to the inner surface of the top wall 13.

With this structure, the adsorbent filter assembly 40 includes the adsorbent filter 46 and the fixing portion 43, and the cap body 31 includes the outlet 16. Thus, when the air cleaner 10 is destined for a location that requires the adsorbent filter 46, the cap body 31 to which the adsorbent filter assembly 40 is coupled is used as the cap. When the air cleaner 10 is destined for a location that does not require the adsorbent filter 46, the adsorbent filter assembly 40 is not coupled to the cap body 31. That is, only the cap body 31 is used as the cap. This simplifies the structure of the adsorbent filter assembly 40. Also, the same cap body 31 may be used regardless of whether or not the adsorbent filter 46 is coupled to.

(3) The fixing portion 43 is annular, and the circumference of the fixing portion 43 is fixed to the inner surface of the top wall 13.

With this structure, the adsorbent filter assembly 40 is assuredly fixed to the cap body 31.

Second Embodiment

A second embodiment of an adsorbent filter assembly 40 will now be described focusing on the differences from the first embodiment with reference to FIG. 5.

Figure 5:
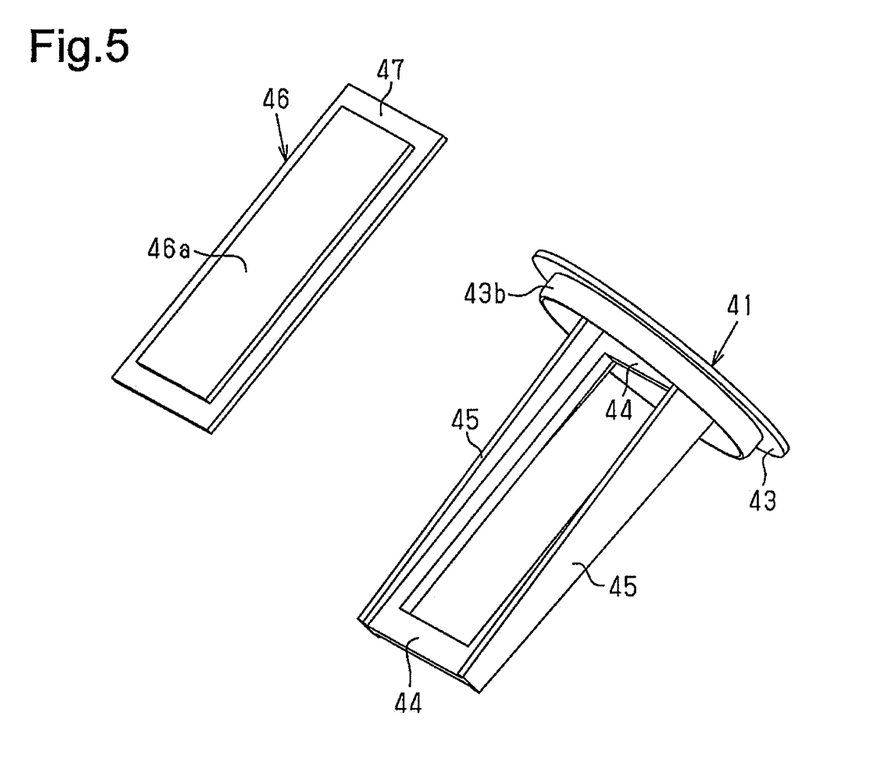
FIG. 5 is an exploded perspective view showing a second embodiment of an adsorbent filter assembly including a holding member and an adsorbent filter.

As shown in FIG. 5, in the same manner as the first embodiment, the holding member 41 of the present embodiment includes the fixing portion 43, the frame 44, and the pillars 45. However, the holding member 41 of the present embodiment does not include the two half bodies 41a, 41b and is formed integrally. Additionally, each pillar 45 has a width tapered toward the distal side, which is distant from the fixing portion 43.

The peripheral edge portion 47 of the adsorbent filter 46 is bonded to an outer surface of the frame 44 to form the adsorbent filter assembly 40.

The second embodiment of the tubular air cleaner for an internal combustion engine has the advantages described below in addition to the advantages (1) through (3) of the first embodiment.

(4) The adsorbent filter assembly 40 includes the frame 44, which is arranged on the periphery of the adsorbent filter 46. The frame 44 includes the two pillars 45 extending in the axial direction of the filter element 50 and each having a width tapered toward the distal side, which is distant from the fixing portion 43.

With this structure, the width of each pillar 45 of the frame 44 is tapered toward the distal side. Thus, when the filter element 50 is fitted onto the adsorbent filter assembly 40, the interference with the pillars 45 is limited. This allows the filter element 50 to be easily coupled to the cap 30 that is formed integrally with the adsorbent filter assembly 40.

Additionally, the pillars 45 are wider toward the basal side. This increases the rigidity of the pillars 45, and ultimately, the rigidity of the adsorbent filter 46.

Additionally, as compared to a structure in which the entire width of each pillar 45 is large and constant, the disturbance of the flow of air flowing through the inner side of the filter element 50 due to the pillars 45 is reduced. Thus, the air pressure loss is reduced.

Third Embodiment

A third embodiment of an air cleaner 10 will now be described focusing on the differences from the first embodiment with reference to FIG. 6.

Figure 6:
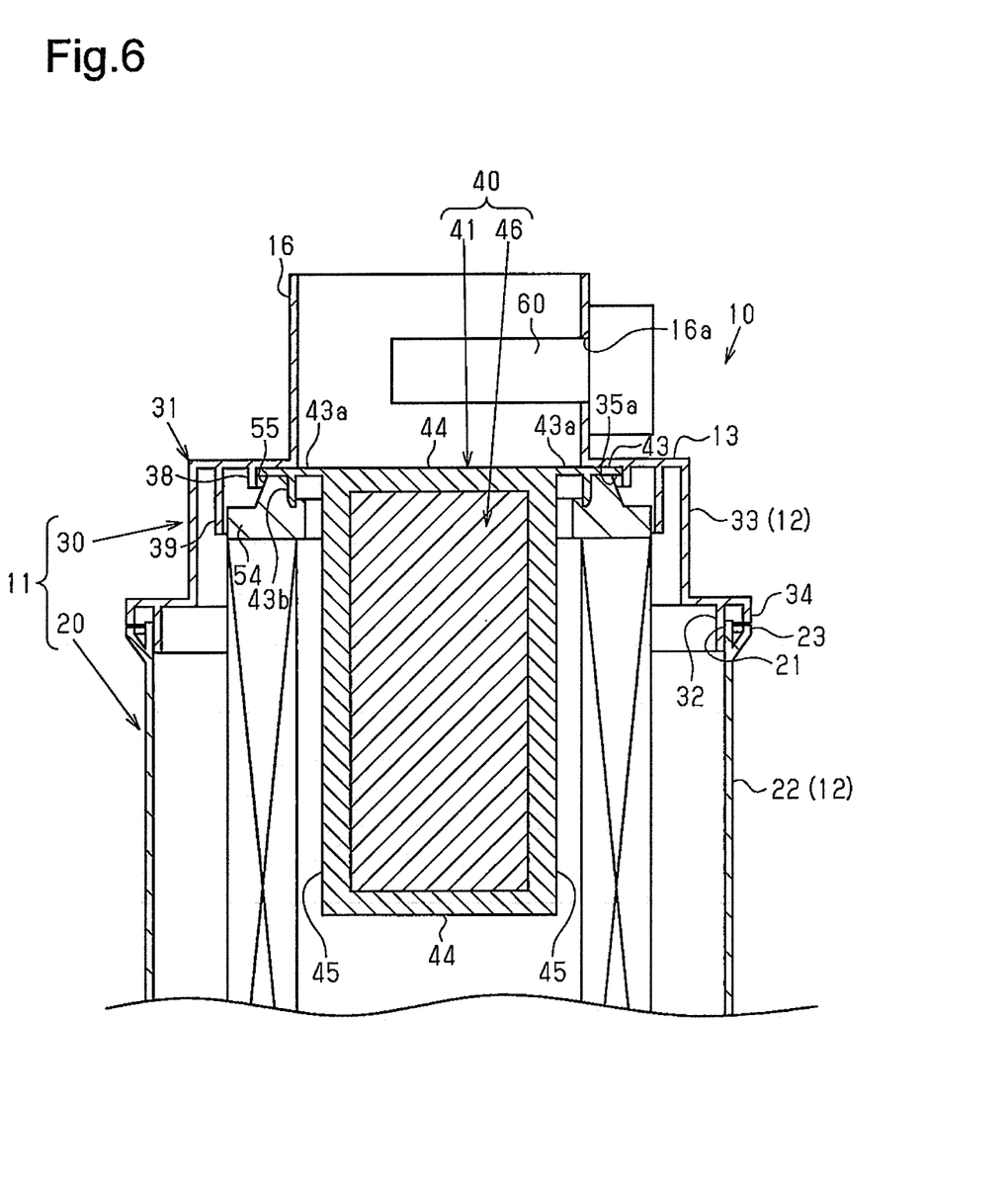
FIG. 6 is a cross-sectional view of a third embodiment of a tubular air cleaner mainly showing an adsorbent filter assembly and an airflow meter.

As shown in FIG. 6, the outlet 16 includes an attachment slot 16a used for attachment of an airflow meter 60, which detects the intake air amount of the internal combustion engine.

In the present embodiment, the airflow meter 60 projects through the attachment slot 16a into the outlet 16. The adsorbent filter 46 is arranged parallel to the projection direction of the airflow meter 60.

The third embodiment of the tubular air cleaner for an internal combustion engine has the advantages described below in addition to the advantages (1) through (3) of the first embodiment.

(5) The adsorbent filter 46 is arranged parallel to the projection direction of the airflow meter 60, which projects through the attachment slot 16a into the outlet 16.

With this structure, when air that has passed through the gaps S1, S2, which are formed between the filter element 50 and the opposite planes 46a, 46b of the adsorbent filter 46, flows through the outlet 16, the air is less likely to be disturbed by the airflow meter 60, which projects into the outlet 16. This limits variations in detection values of the airflow meter 60.

Modified Examples

The above embodiments may be modified as follows.

The layer structure of the adsorbent filter 46 may be changed, for example, by omitting the glass fiber nets. The material forming the adsorbent layer only needs to adsorb evaporated fuel. Thus, an adsorbent differing from activated carbon such as zeolite may be used.

The adsorbent filter 46 may be arranged so as not to extend through the central axis of the filter element 50.

The adsorbent filter 46 may be inclined from the axial direction of the filter element 50.

The shape of the adsorbent filter 46 may be changed from the rectangular plate to, for example, a trapezoidal plate.

The fixing portion 43 of the adsorbent filter assembly 40 only needs to be fixed to the inner surface of the top wall 13 of the cap body 31 and does not have to have the substantially annular shape. The fixing portion 43 may be shaped as, for example, a plurality of legs extending from the frame 44.

When the holding member 41 is molded from a resin, the adsorbent filter 46 may be inserted so that the holding member 41 is molded integrally with the adsorbent filter 46.

The above embodiments are intended to be illustrative, and the present invention is not limited to the above-described embodiments. Various alternatives, modifications and variations are possible to the disclosed exemplary embodiments without departing from the spirit and scope of the present invention. For example, the subject matter of the present invention may exist in fewer features than all of the features of the particular embodiments disclosed. The claims are incorporated into the detailed description and each claim by itself claims a separate embodiment. The scope of the invention is intended to embrace all such alternatives, modifications and variations, along with all equivalents thereof, within the scope of the claims.

The invention claimed is:

1. A tubular air cleaner for an internal combustion engine arranged in an intake air passage of the internal combustion engine, the tubular air cleaner comprising:
    a tubular housing including a circumferential wall including an inlet, a top wall including an outlet, and a bottom wall opposed to the top wall; and
    a tubular filter element accommodated in the housing, wherein
    the housing includes a case including the bottom wall and a cap including the top wall,
    the cap is coupled to the case in a removable manner,
    the cap includes a cap body, which includes the top wall and the outlet, and an adsorbent filter assembly,
    the adsorbent filter assembly includes a planar adsorbent filter, which adsorbs evaporated fuel of the internal combustion engine, and a fixing portion, which is formed integrally with the adsorbent filter and fixed to an inner surface of the top wall,
    the adsorbent filter is located at an inner side of the filter element and extends in an axial direction of the filter element, and
    the filter element includes an inner surface spaced apart from each of opposite planes of the adsorbent filter by a gap that allows air, which has flowed through the filter element into the inner side of the filter element, to reach the outlet without passing through the adsorbent filter.

2. A tubular air cleaner for an internal combustion engine arranged in an intake air passage of the internal combustion engine, the tubular air cleaner comprising:
    a tubular housing including a circumferential wall including an inlet, a top wall including an outlet, and a bottom wall opposed to the top wall; and
    a tubular filter element accommodated in the housing, wherein
    the housing includes a case including the bottom wall and a cap including the top wall,
    the cap is coupled to the case in a removable manner,
    the cap includes a cap body, which includes the top wall and the outlet, and an adsorbent filter assembly,
    the adsorbent filter assembly includes a planar adsorbent filter, which adsorbs evaporated fuel of the internal combustion engine, and a fixing portion, which is formed integrally with the adsorbent filter and fixed to an inner surface of the top wall,
    the adsorbent filter is located at an inner side of the filter element and extends in an axial direction of the filter element, and
    the filter element includes an inner surface spaced apart from each of opposite planes of the adsorbent filter by a gap that allows air, which has flowed through the filter element into the inner side of the filter element, to reach the outlet without passing through the adsorbent filter,
    wherein the fixing portion is annular and includes a circumference that is entirely fixed to the inner surface of the top wall.

3. The tubular air cleaner according to claim 1, wherein the adsorbent filter assembly includes a frame arranged on a periphery of the adsorbent filter,
    the frame includes two pillars extending in an axial direction of the filter element, and
    each of the two pillars has a width that is tapered toward a distal side, which is distant from the fixing portion.

4. The tubular air cleaner according to claim 1, wherein the outlet includes an attachment slot used for attachment of an airflow meter, which detects an intake air amount,
    the airflow meter projects through the attachment slot into the outlet, and
    the adsorbent filter is arranged parallel to a projection direction of the airflow meter.

* * * * *